United States Patent
Ju (10) Patent No.: US 12,525,602 B2
(45) Date of Patent: Jan. 13, 2026

(54) ELECTRODE PLATE REEL HOLDING APPARATUS OF ELECTRODE PLATE SLITTING MACHINE FOR SECONDARY BATTERY

(71) Applicant: BU KYONG SYSTEM CO., LTD., Yangsan-si (KR)

(72) Inventor: Gi Wan Ju, Busan (KR)

(73) Assignee: BU KYONG SYSTEM CO., LTD., Yangsan-si (KR)

( * ) Notice: Subject to any disclaimer, the term of this patent is extended or adjusted under 35 U.S.C. 154(b) by 658 days.

(21) Appl. No.: 17/975,221

(22) Filed: Oct. 27, 2022

(65) Prior Publication Data
US 2024/0097105 A1  Mar. 21, 2024

(30) Foreign Application Priority Data
Sep. 16, 2022 (KR) .................... 10-2022-0117266

(51) Int. Cl.
*H01M 4/13* (2010.01)
*H01M 4/139* (2010.01)

(52) U.S. Cl.
CPC .................................. *H01M 4/139* (2013.01)

(58) Field of Classification Search
CPC .... H01M 4/139; H01M 10/0404; H01M 4/04; H01M 10/04; H01M 10/0587; Y02P 70/50; Y02E 60/10; B21C 47/006; B65D 85/672; B26D 2007/0031; B26D 2210/11; B26D 7/01; B26D 2007/0075; B65H 75/02
USPC ........................................................ 248/51
See application file for complete search history.

(56) References Cited

U.S. PATENT DOCUMENTS

| | | | | |
|---|---|---|---|---|
| 2005/0104288 A1* | 5/2005 | Omomo | ............... | G07F 17/3202 273/142 R |
| 2005/0194490 A1* | 9/2005 | Wisniewski | ....... | B65H 75/2484 242/573.4 |
| 2012/0048986 A1* | 3/2012 | Enwald | ................ | B65H 19/126 242/598.5 |
| 2024/0079549 A1* | 3/2024 | Yang | ................... | H01M 4/0435 |
| 2024/0097105 A1* | 3/2024 | Ju | ......................... | H01M 4/139 |
| 2024/0297330 A1* | 9/2024 | Wang | ................ | H01M 10/0431 |
| 2025/0132306 A1* | 4/2025 | Bae | ......................... | B21H 8/02 |
| 2025/0192139 A1* | 6/2025 | Yoo | ....................... | H01M 4/139 |
| 2025/0201893 A1* | 6/2025 | Gwon | ................... | H01M 10/04 |

FOREIGN PATENT DOCUMENTS

| KR | 20070064764 A | | 6/2007 | |
|---|---|---|---|---|
| KR | 102432112 B1 | * | 8/2022 | ........... B65H 19/123 |

* cited by examiner

*Primary Examiner* — Muhammad Ijaz
(74) *Attorney, Agent, or Firm* — NKL Law; Jae Youn Kim (57) ABSTRACT

Provided is an electrode plate reel holding apparatus of an electrode plate slitting machine for a secondary battery including a hanger member which is spaced apart from a bottom surface and on which at least one wound electrode plate reel is hung using a hollow support shaft, a cradle configured to support the hanger member, and a separation-preventing part including a stopper inserted into a through hole of the support shaft to be appealable and disappearable. The separation-preventing part may move the stopper into the through hole of the support shaft so that the electrode plate reel inserted into the support shaft moves without interference and move the stopper out of the through hole of the support shaft so that the electrode plate reel inserted into the support shaft is separated to the outside.

9 Claims, 13 Drawing Sheets

ELECTRODE PLATE REEL HOLDING APPARATUS OF ELECTRODE PLATE SLITTING MACHINE FOR SECONDARY BATTERY

CROSS-REFERENCE TO RELATED APPLICATION

This application claims priority to and the benefit of Korean Patent Application No. 10-2022-0117266, filed on Sep. 16, 2022, the disclosure of which is incorporated herein by reference in its entirety.

BACKGROUND

1. Field of the Invention

The present disclosure relates to an electrode plate reel holding apparatus of an electrode plate slitting machine for a secondary battery for safely transporting and storing an electrode plate reel that is slit through a slitting process.

2. Discussion of Related Art

The development and use of secondary batteries have recently been increasing due to the advantages of being rechargeable and capable of being small in size and large in capacity. The secondary batteries may generally be classified into cylindrical secondary batteries, prismatic secondary batteries, pouch-type secondary batteries, and the like according to a structural feature. Such secondary batteries include, for example, nickel-cadmium batteries, nickel-hydrogen batteries, nickel-zinc batteries, lithium secondary batteries, and the like.

Figure 1:
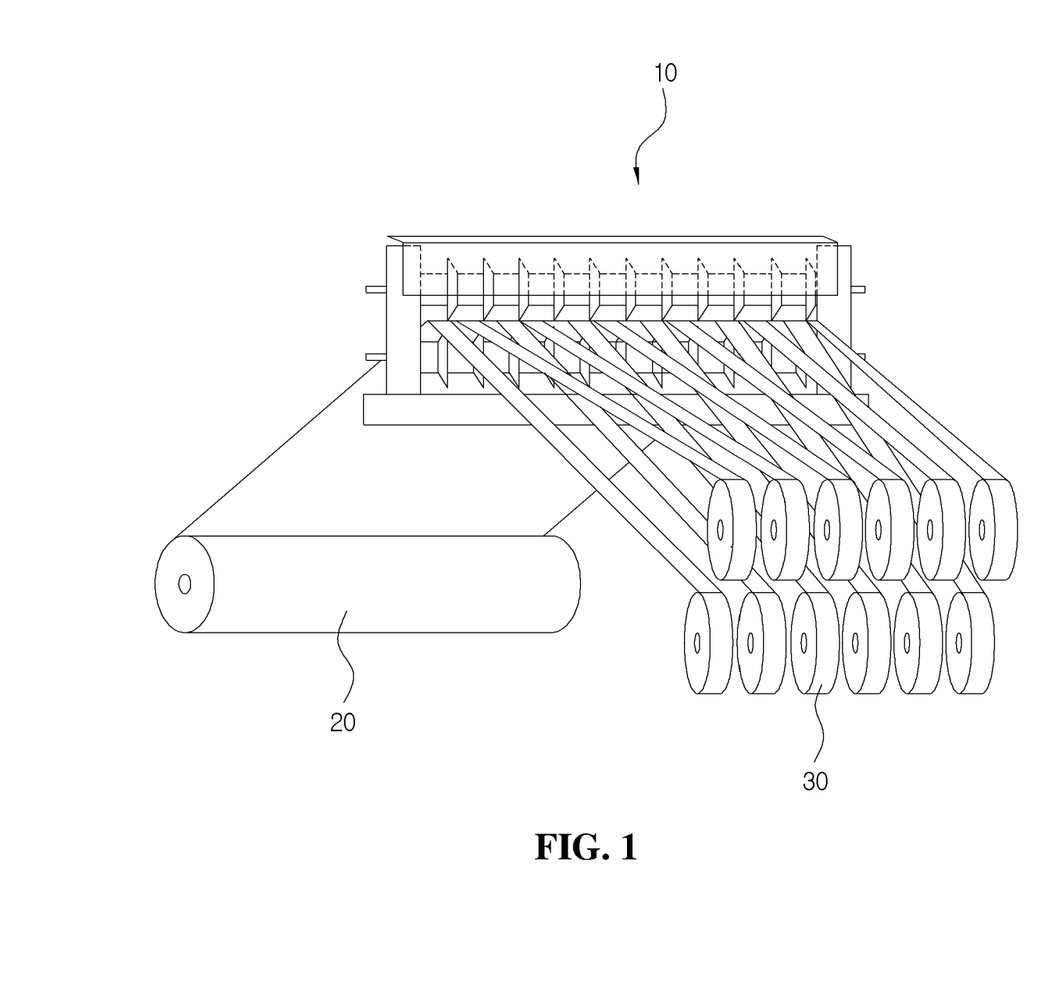
FIG. 1 is a view schematically illustrating a process in which an electrode plate slitting machine for a secondary battery slits an electrode plate roll of a large width and rewinds the slit electrode plate strip on a winder to form an electrode plate reel.

In general, a manufacturing process of an electrode plate for a lithium secondary battery includes an electrode slurry preparation process, a slurry coating process on an electrode current collector, a pressing process, a slitting process, and the like. Here, as shown in FIG. 1, in the slitting process, an electrode plate slitting machine 10 for a lithium secondary battery is used to cut an electrode plate roll 20 of a large width into a plurality of electrode plates to meet the actual electrode assembly specifications, and each cut electrode plate is wound in the form of a reel. An electrode plate reel 30 manufactured through the slitting process is transferred to a winder of notching equipment for processing the shape of an electrode tab, and a notching process is performed.

The weight of the electrode plate reel wound around a cylindrical core is different depending on a winding diameter, but is usually in a range of 25 kg to 50 kg, and thus, a number of workers directly carry the electrode plate reel, which is slit in the slitting process, using a transport cradle.

However, there is a risk of injury when the worker performs the work of repeatedly moving the heavy electrode plate reel directly. In addition, there is a great concern that the electrode plate reel may collide with another electrode plate reel adjacent thereto to be damaged while the electrode plate reels are aligned at a narrow interval on the cradle or transported, and the electrode plate reel may even fall out of the cradle during transportation to cause a safety accident. In addition, when performing the operation of separating the electrode plate reel inserted into the cradle in order to mount the electrode plate reel to the notching equipment, the heavy electrode plate reel is pulled out by manpower, and thus there is a problem in that work efficiency is reduced.

PRIOR-ART DOCUMENTS

Patent Document

[Document 1] Korean Registered Patent No. 10-1211804 (registered on Dec. 6, 2012)

Non-Patent Document

None

SUMMARY OF THE INVENTION

The present disclosure is directed to providing an electrode plate reel holding apparatus of an electrode plate slitting machine for a secondary battery, capable of performing an operation of transporting an electrode plate reel, which is slit through a slitting process, using a stopper configured to restrict the movement of the electrode plate reel, improving the efficiency of the operation of transporting the electrode plate reel due to the easy and convenient operation of the stopper, suppressing damage to the electrode plate reel in a process of handling the electrode plate reel, and safely storing the electrode plate reel.

According to an aspect of the present disclosure, there is provided an electrode plate reel holding apparatus of an electrode plate slitting machine for a secondary battery, including a hanger member which is spaced apart from a bottom surface and on which at least one wound electrode plate reel is hung using a hollow support shaft, a cradle configured to support the hanger member, and a separation-preventing part including a stopper retractably inserted into a through hole of the support shaft, and configured to hide the stopper into the through hole of the support shaft so that the electrode plate reel inserted into the support shaft moves without interference and protrude the stopper out of the through hole of the support shaft so that the electrode plate reel inserted into the support shaft is prevented from being separated.

Further, the cradle may include a plate-shaped base plate in contact with the bottom surface and configured to support an upper load, a side plate erected on the base plate, and a shaft fixture configured to fix one side of the support shaft to an upper end of the side plate.

Further, a protective pad for impact mitigation may be installed on the shaft fixture.

Further, the hanger member may include upper rollers and side rollers configured to guide a movement of the electrode plate reel, and the upper rollers and the side rollers may be installed on upper and side surfaces of the support shaft, respectively, in a longitudinal direction.

Further, the separation-preventing part may include a guide rail in which a stopper insertion groove and a rail through-hole configured to accommodate the stopper are formed at one end and the other end facing each other with a groove having an open top therebetween, an operating rod installed in a direction crossing the stopper and configured to control a position movement of the stopper, and an operation part configured to manually operate the operating rod.

Further, the operating rod may include a rod body, wherein a guide groove may be formed in a side surface of the rod body facing the stopper insertion groove, and the rod body may be formed of a straight plate extending in a longitudinal direction of the guide rail.

Further, the stopper may have a cylindrical body in which a rod insertion-hole is formed at a center thereof, and may include a stopper roller installed in the rod insertion-hole to guide a movement of the rod body inserted into the rod insertion-hole, one side of the stopper may be elastically supported by an elastic member embedded in the stopper insertion groove, a stopper front end may be coupled to the other side of the stopper, and the stopper front end may appear and disappear along a movement path formed by aligning the rail through-hole and a through-hole of the support shaft.

Further, a rod front end of the rod body may be formed in a ring shape to be connected to one side of the operation part, and a pressing plate may be fastened to a rod tail part of the rod body using a fastening member.

Further, the operation part may include a holder having one side connected to the rod front end, and a lever connected to the other side of the holder that is elastically supported by an elastic member.

Further, the electrode plate reel holding apparatus may include a transport jig configured to move the rod body by applying an external force to the pressing plate.

Further, at least one wound electrode plate reel may be transported using an automated guided vehicle in which the transport jig is installed.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present disclosure will be described by describing embodiments of the present disclosure with reference to the accompanying drawings. Like reference numerals given in each drawing denote like elements. Further, in the following description of the present disclosure, when it is determined that detailed descriptions of related well-known functions or configurations unnecessarily obscure the gist of the present disclosure, the detailed descriptions thereof will be omitted. It will also be understood that the terms "comprise" and/or "comprising," when used herein, specify the presence of stated components but do not preclude the presence or addition of one or more other components unless mentioned otherwise.

Figure 2:
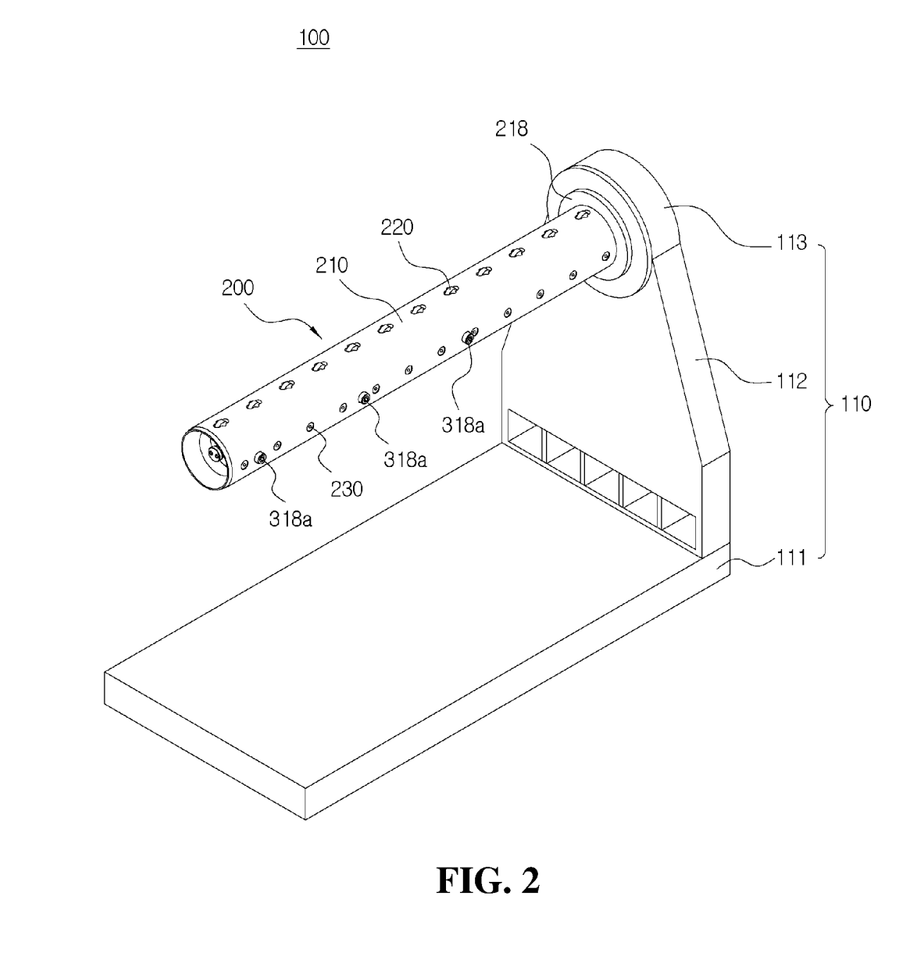
FIG. 2 is a perspective view of an electrode plate reel holding apparatus of an electrode plate slitting machine for a secondary battery according to an embodiment of the present disclosure.
Figure 3:
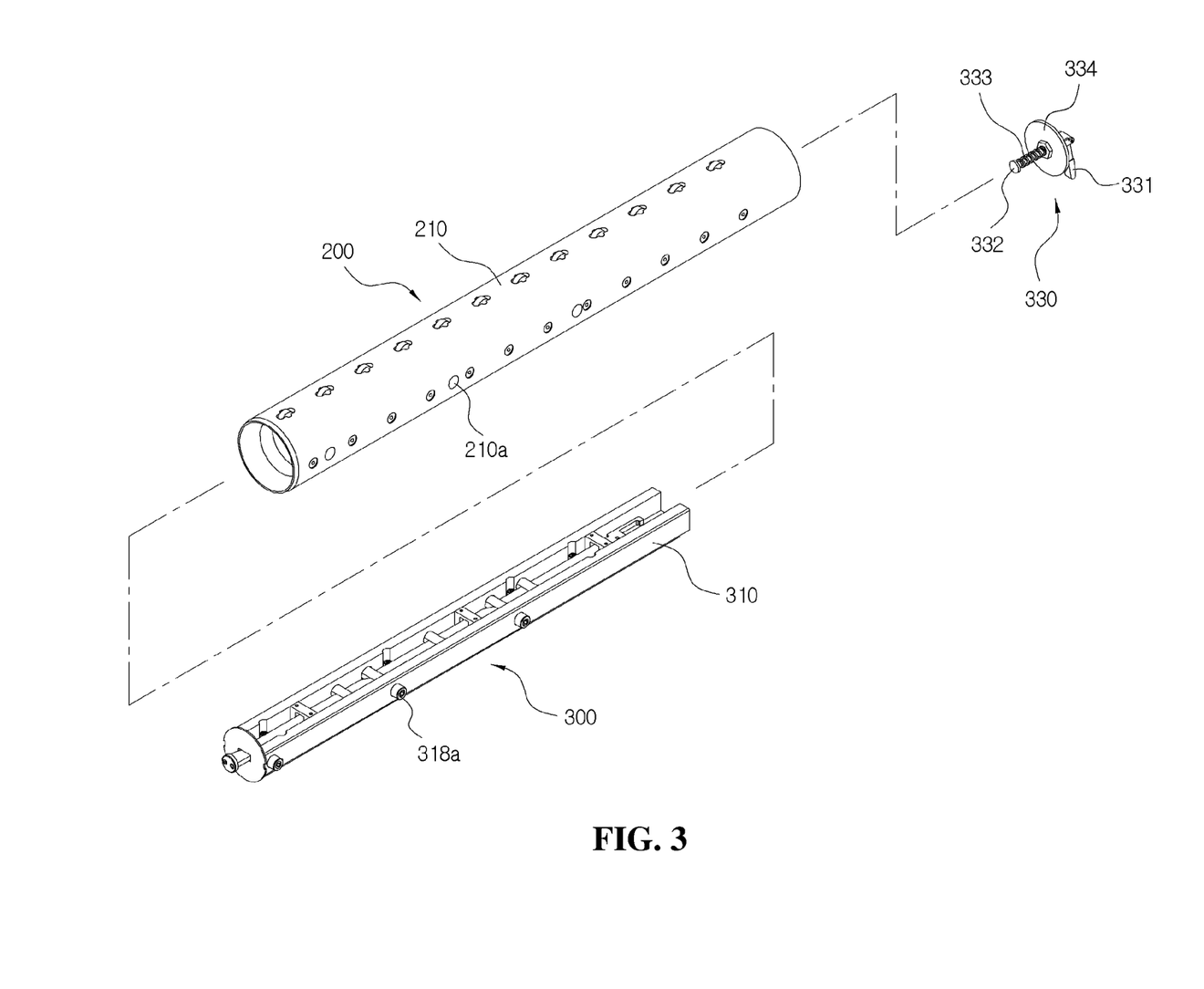
FIG. 3 is an exploded perspective view for describing a coupling structure of a support shaft of a hanger member and a separation-preventing part according to the embodiment of the present disclosure.

Referring to FIGS. 2 and 3, an electrode plate reel holding apparatus 100 of an electrode plate slitting machine for a secondary battery according to an embodiment of the present disclosure may include a hanger member 200 having a support shaft 210 on which a wound electrode plate reel 30 is hung, a cradle 110 configured to support the hanger member 200, and a separation-preventing part 300 configured to restrict the movement of the electrode plate reel 30 by using a stopper 318 that is retractably inserted into a support shaft through-hole 210a, which is formed in the support shaft 210 of the hanger member 200.

The cradle 110 includes a base plate 111, a side plate 112, and a shaft fixture 113.

The base plate 111 is formed in a plate shape and is stably supported on a bottom surface.

The side plate 112 may be vertically erected and installed by being biased toward one side of the base plate 111 in order to prevent the electrode plate reel 30 from interfering with the structure when an operation of inserting or withdrawing the electrode plate reel 30 in one-side direction is performed. A height of the side plate 112 may be appropriately set to correspond to a diameter of the electrode plate reel 30 inserted into the support shaft 210.

The shaft fixture 113 configured to fix one side of the support shaft 210 is installed on an upper end of the side plate 112. As such, one side of the support shaft 210 may be fixed to the shaft fixture 113, and the support shaft 210 may maintain a posture parallel to the base plate 111 in a horizontal direction at a predetermined interval. For example, the entire electrode plate reel holding apparatus 100 may be formed in a "C" shape.

The support shaft 210 may be formed in a hollow pipe shape extending in a longitudinal direction, and at least one support shaft through-hole 210a may be formed in a side surface of the support shaft 210. Here, the shape of the support shaft 210 is not necessarily specifically limited, and is preferably set to correspond to the shape of a core 32 of the electrode plate reel 30, which is inserted into the support shaft 210.

The wound electrode plate reel 30 may be inserted into one side of the support shaft 210 and horizontally moved toward the shaft fixture 113 on the other side of the support shaft 210, and by repeating this, a plurality of electrode plate reels 30 may be mounted on the support shaft 210 in a dense form. In this case, the inserted electrode plate reel 30 may be brought into contact with the shaft fixture 113, and thus, in the embodiment, a protective pad 218 for impact mitigation is installed. The protective pad 218 may be made of a urethane material having excellent durability and impact absorption property.

The hanger member 200 includes an upper roller 220 and a side roller 230. That is, a plurality of upper rollers 220 and a plurality of side rollers 230 are installed on upper and side surfaces of the support shaft 210, respectively, along the longitudinal direction. The upper rollers 220 and the side rollers 230 may be in contact with an inner surface of the core 32 of the electrode plate reel 30, which is inserted into the support shaft 210, and can guide a sliding movement.

The separation-preventing part 300 is accommodated in the support shaft 210 and includes a stopper 318, which is retractably inserted into the through-hole 210a of the support shaft 210. The separation-preventing part 300 may be configured to move the stopper 318 into the through-hole 210a of the support shaft 210 so that the electrode plate reel 30 inserted into the support shaft 210 can move without interference, and move the stopper 318 out of the through-hole 210a of the support shaft 210 so that the electrode plate reel 30 inserted into the support shaft 210 cannot escape to the outside.

In addition, the movement of the stopper 318 may be manually operated using a lever 331 of an operation part 330 or operated using a transport jig 400 to be described below.

Figure 4:
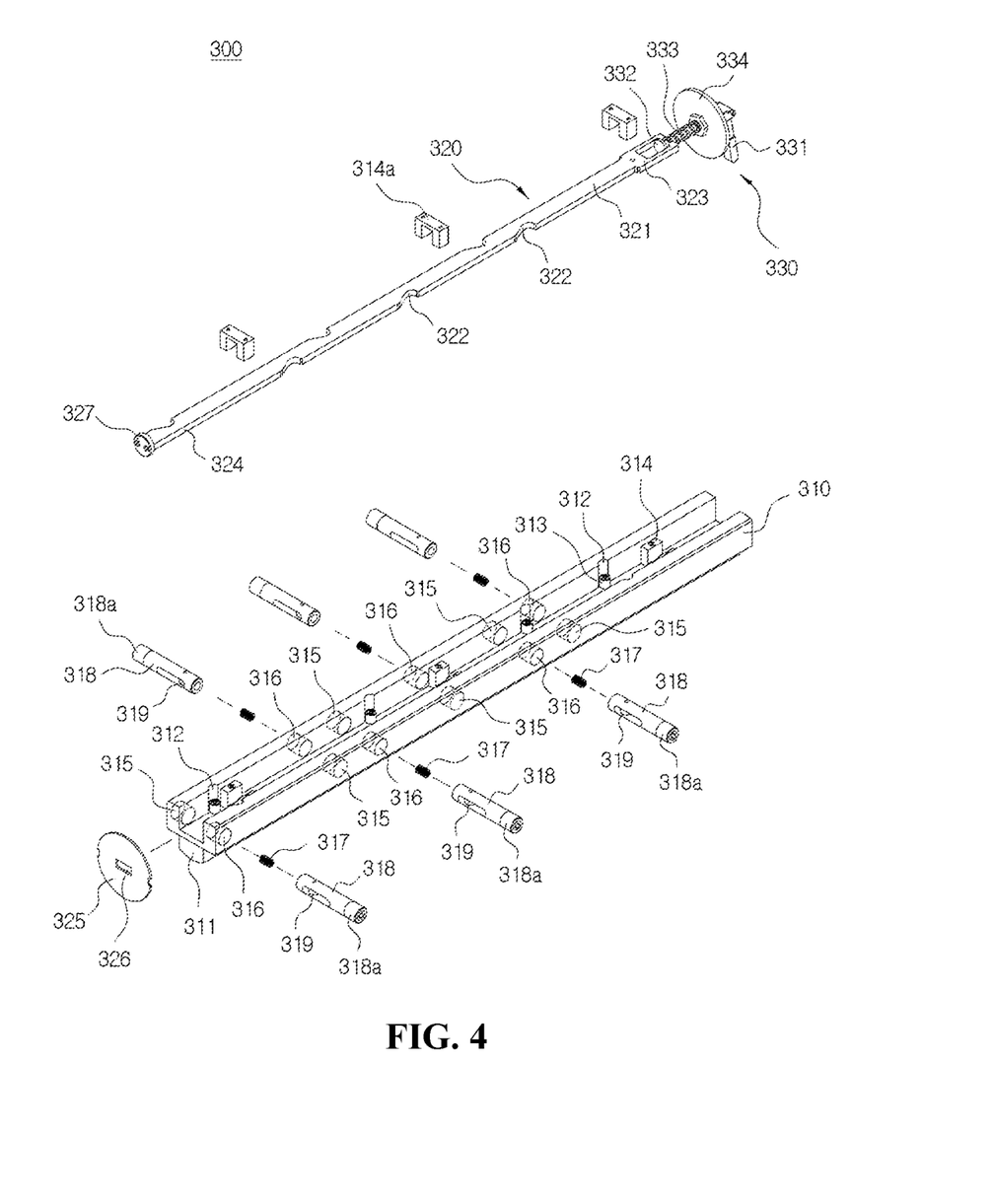
FIG. 4 is an exploded perspective view of the separation-preventing part according to the embodiment of the present disclosure.

Referring to FIG. 4, the separation-preventing part 300 may include a guide rail 310, an operating rod 320, and the operation part 330.

A rail fixture 311 protrudes downward from a lower portion of the guide rail 310, and the rail fixture 311 is fixedly installed in the hollow support shaft 210.

The operating rod 320 is disposed to be movable forward and backward in a groove formed by opening an upper portion of the guide rail 310, and an auxiliary roller 313 installed in a roller installation groove 312 guides smooth movement of the operating rod 320. A bracket 314 and a bracket fixing part 314a for preventing separation of the operating rod 320 may be provided on the guide rail 310.

A stopper insertion groove 315 for accommodating the stopper 318 and a rail through-hole 316 are formed in the guide rail 310 with the operating rod 320 therebetween. The stopper insertion groove 315 and the rail through-hole 316 are provided in a pair, a plurality of stopper insertion grooves 315 and a plurality of rail through-holes 316 are provided to correspond to the number of the stoppers 318, and positions of the stopper insertion groove 315 and the rail through-hole 316 installed in the guide rail 310 may be alternately changed to correspond to a direction in which the stopper 318 appears. Here, when the rail through-hole 316 is aligned with the through hole 210a of the support shaft 210, and the guide rail 310 is inserted into the support shaft 210 as shown in FIG. 3, the stopper front end 318a may appear through the support shaft through-hole 210a as the rail through-hole 316 and the support shaft through-hole 210a are aligned. That is, the stopper front end 318a may appear and disappear along a movement path formed by aligning the rail through-hole 316 and the support shaft through-hole 210a.

The appearing and disappearing operation of the stopper 318 is performed in conjunction with the movement of the operating rod 320. The stopper 318 may be formed of a cylindrical body in the form of a pin, a through hole may be formed in a center of the body, and the stopper front end 318a may be fastened to one side of the cylindrical body using a fastening member.

The operating rod 320 may be installed to cross the stopper 318. The operating rod 320 includes a rod body 321 having a plate shape extending in the longitudinal direction, a guide groove 322 is formed on a side surface of the rod body 321, and the guide groove 322 faces the stopper insertion groove 315. A plurality of guide grooves 322 may be provided to correspond to the stoppers 318.

One side of the stopper 318 is elastically supported by an elastic member 317 accommodated in the stopper insertion groove 315, and the other side of the stopper 318 is inserted into the rail through-hole 316. In the embodiment, when the operating rod 320 is installed to pass through a rod insertion-hole formed in the body of the stopper 318, a stopper roller 319 presses and comes into contact with a side surface of the rod body 321 by the elastic member 317. The operating rod 320 moves by crossing the stopper 318, and a position of the stopper roller 319 in a pressurized state is moved along a side surface line of the rod body 321.

A rod front end 323 of the rod body 321 is formed in a ring shape to be connected to one side of the operation part 330

The operation part 330 includes a holder 332 having one side connected to the rod front end 323, and the lever 331 for manual operation connected to the other side of the holder 332 that is elastically supported by an elastic member 333.

Figure 5:
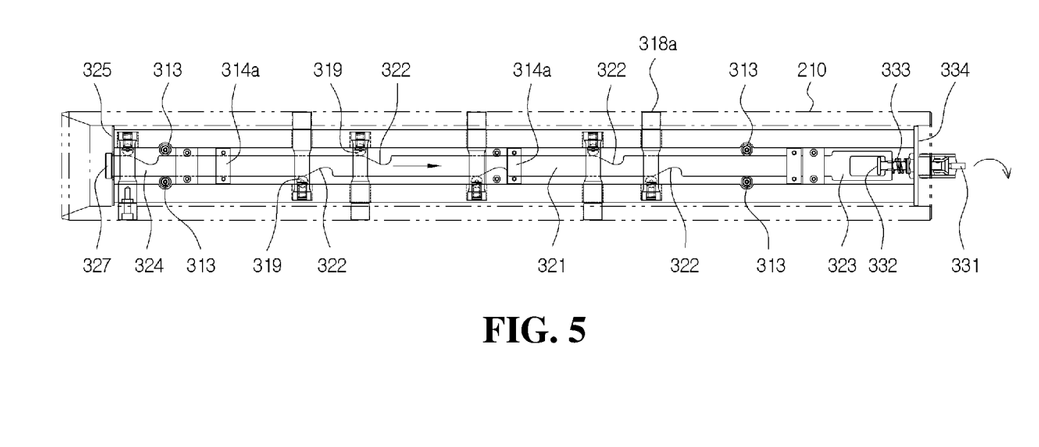
FIG. 5 is a view illustrating a state in which a front end of a contracted stopper is inserted into a support shaft.

When the elastic member 333 is contracted as the lever 331 is pulled and operated in a folding direction, the rod front end 323 connected to the holder 332 is moved toward a front cover 334 fixed to the shaft fixture 113. As shown in FIG. 5, the stopper roller 319 moves to the side surface of the rod body 321 along the guide groove 322 of the rod body 321, one side of the stopper 318 moves in a direction of pressing the elastic member 317 interposed in the stopper insertion groove 315, and the other side of the stopper 318, that is, the stopper front end 318a is hidden by entering the rail through-hole 316 and the support shaft through-hole 210a, and at this time, the stopper 318 is in a contracted state. Since the electrode plate reel is not interfered with by the stopper front end 318a in the state in which the stopper 318 is contracted, the electrode plate reel 30 can be smoothly moved in the horizontal direction of the support shaft 210.

Figure 6:
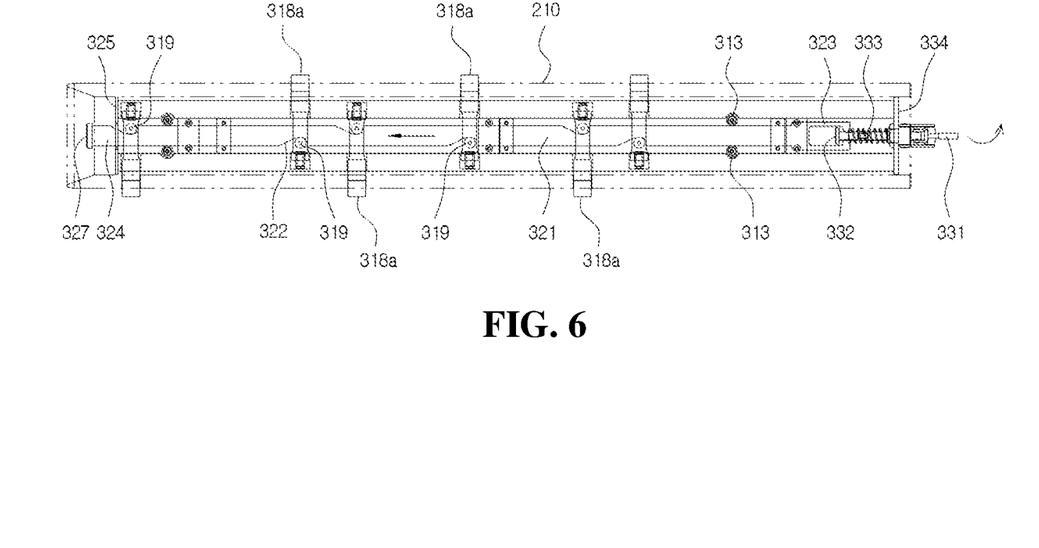
FIG. 6 is a view illustrating a state in which the front end of the relaxed stopper protrudes out of the support shaft.
Figure 7:
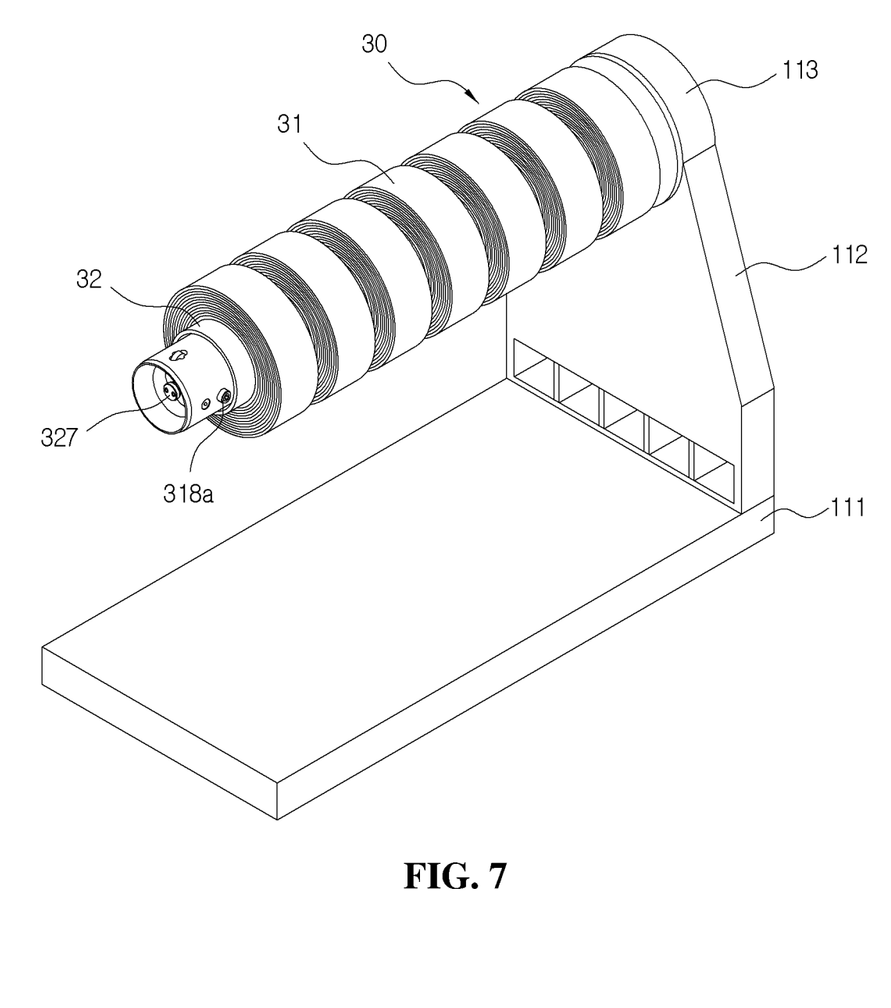
FIG. 7 is an exemplary view illustrating the use of the electrode plate reel holding apparatus of the electrode plate slitting machine for a secondary battery according to the embodiment of the present disclosure.

When the operation is performed in a direction in which the lever 331 is unfolded, the rod front end 323 connected to the holder 332 is moved to an opposite side of the front cover 334 by an elastic force of the elastic member 333. As shown in FIG. 6, as the stopper roller 319 moves on the side surface of the rod body 321 toward the guide groove 322, and one side of the stopper 318 moves to the rail through-hole 316 by the elastic force of the elastic member 317 of the stopper insertion groove 315, the stopper front end 318a protrudes out of the support shaft through-hole 210a. This means that the stopper 318 is in a relaxed state. The core 32 of the electrode plate reel 30, which is inserted into the support shaft 210 in the state in which the stopper 318 is relaxed, is interfered with by the stopper front end 318a, and the movement thereof is restricted. As illustrated in FIG. 7, the plurality of electrode plate reels 30, in each of which an electrode plate 31 is wound on the core 32, may be stably mounted densely while being inserted into the support shaft 210 in the horizontal direction. Since the stopper front end 318a protrudes out of the through-hole 210a of the support shaft 210 in the state in which the stopper 318 is in a relaxed state, the core 32 of the outermost electrode plate reel 30 may be prevented from moving out of the support shaft 210.

Further, an inner surface of the core 32 of another electrode plate reel 30 mounted on an inner side of the support shaft 210 may block the through-hole 210a of the support shaft 210. At this point, the stopper front end 318a may be in close contact with the inner surface of the core 32 outside the through hole 210a and may apply a significant pressure to the inner surface of the core 32, so that a movement of the electrode plate reel 30 can be suppressed.

The operating rod 320 may be moved using the lever 331 of the operation part 330 as described above.

Figure 8:
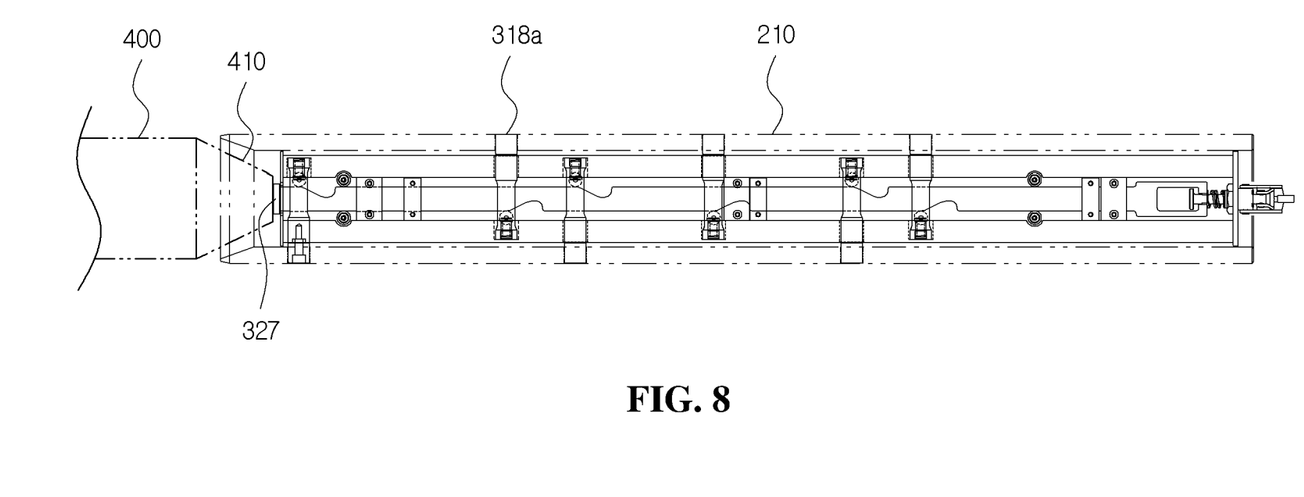
FIG. 8 is a view illustrating a state in which the separation-preventing part is switched to a reel release mode using a transport jig according to the embodiment of the present disclosure.
Figure 9:
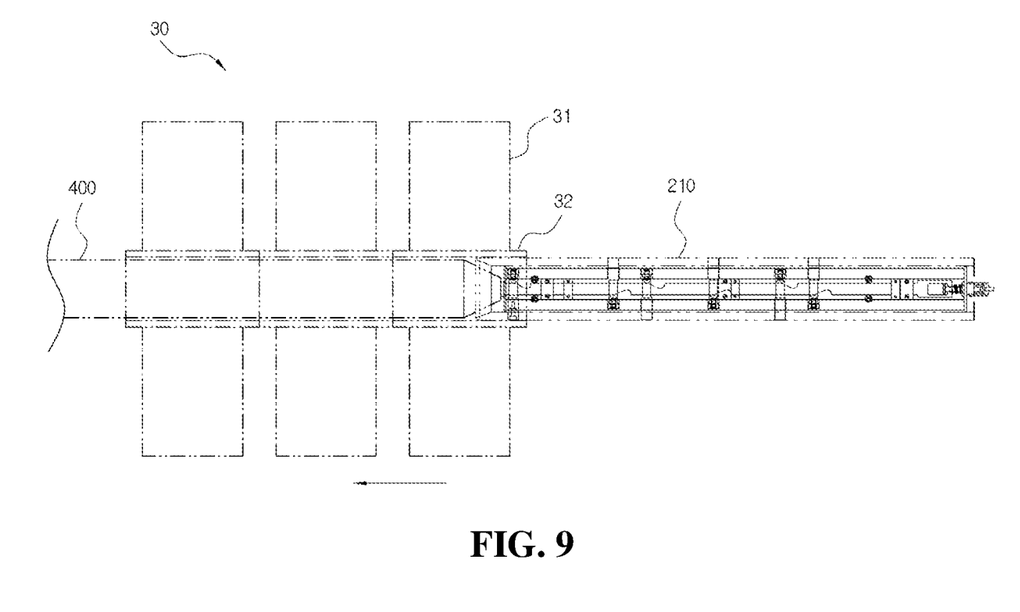
FIG. 9 is a view illustrating an operation of transporting the electrode plate reel to the transport jig of FIG. 8.

A pressing plate 327 may be fastened to a rod tail part 324 of the rod body 321. The transport jig 400 to be described below may press the pressing plate 327 to move the operating rod 320. Referring to FIG. 8, a jig front end 410 having a tapered shape may be formed at one side of the transport jig 400, and the rod body 321 of the operating rod 320 may move backward as the jig front end 410 presses the pressing plate 327. Accordingly, the stopper roller 319 moves to the side surface of the rod body 321 along the guide groove 322 of the rod body 321, one side of the stopper 318 moves in the direction of pressing the elastic member 317 interposed in the stopper insertion groove 315, and the other side of the stopper 318, that is, the stopper front end 318a is hidden by entering the rail through-hole 316 and the support shaft through-hole 210a, and at this time, the stopper 318 is in a contracted state. Since the core 32 of the electrode plate reel 30 is not interfered with by the stopper front end 318a in the state in which the stopper 318 is contracted, the electrode plate reel 30 can be smoothly moved toward the transport jig 400 disposed in the horizontal direction of the support shaft 210.

FIGS. 10A to 10E are views illustrating a transport operation performed using a transport jig of an automated guided vehicle according to the embodiment of the present disclosure. Here, an automated guided vehicle 500 is equipment for automatically transporting the plurality of electrode plate reels 30, and may travel a floor without a rail and use an electric battery as a power source. For example, the plurality of electrode plate reels stored on the support shaft 210 may be moved to notching equipment using the automated guided vehicle 500 to which the transport jig 400 is applied.

Figure 10A:
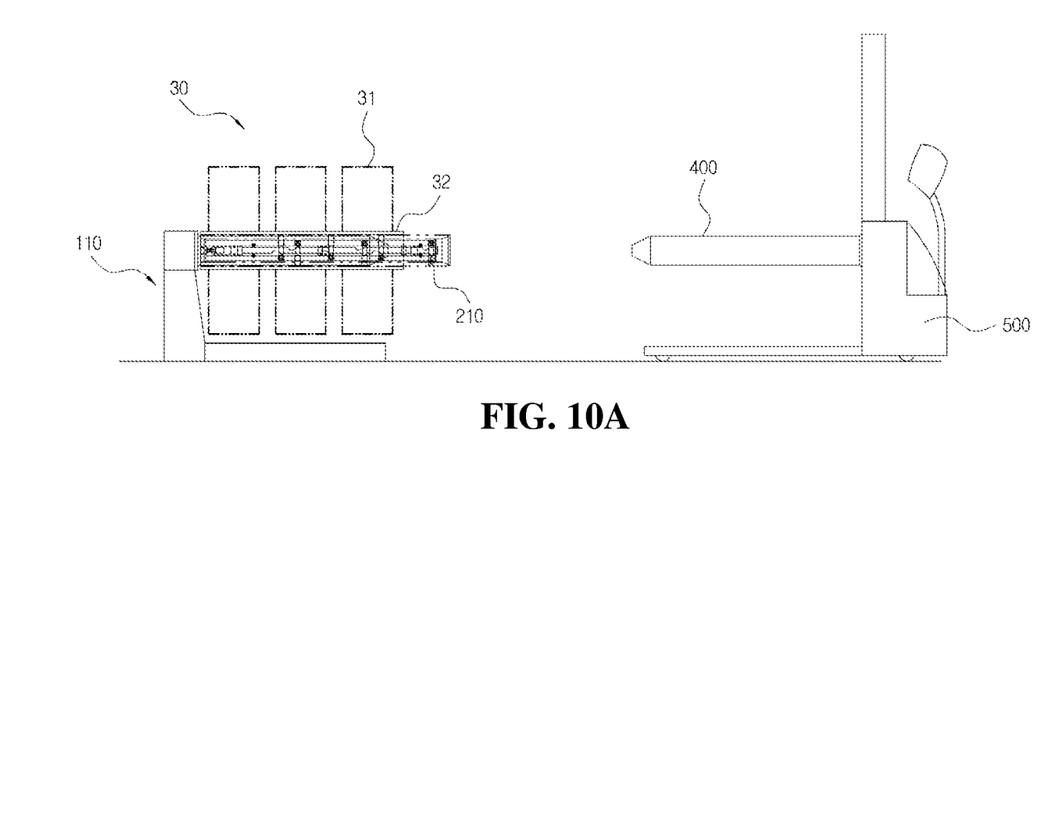
FIGS. 10A to 10E are views illustrating a transport operation performed using a transport jig of an automated guided vehicle according to the embodiment of the present disclosure.

In FIG. 10A, the transport jig 400 of the automated guided vehicle 500 is aligned to face the support shaft 210 of the electrode plate reel holding apparatus 100. Thereafter, as the automated guided vehicle 500 moves and approaches the transport jig 400 to the support shaft 210, the jig front end 410 presses the pressing plate 327 installed in the rod tail part 324 of the rod body 321.

Figure 10B:
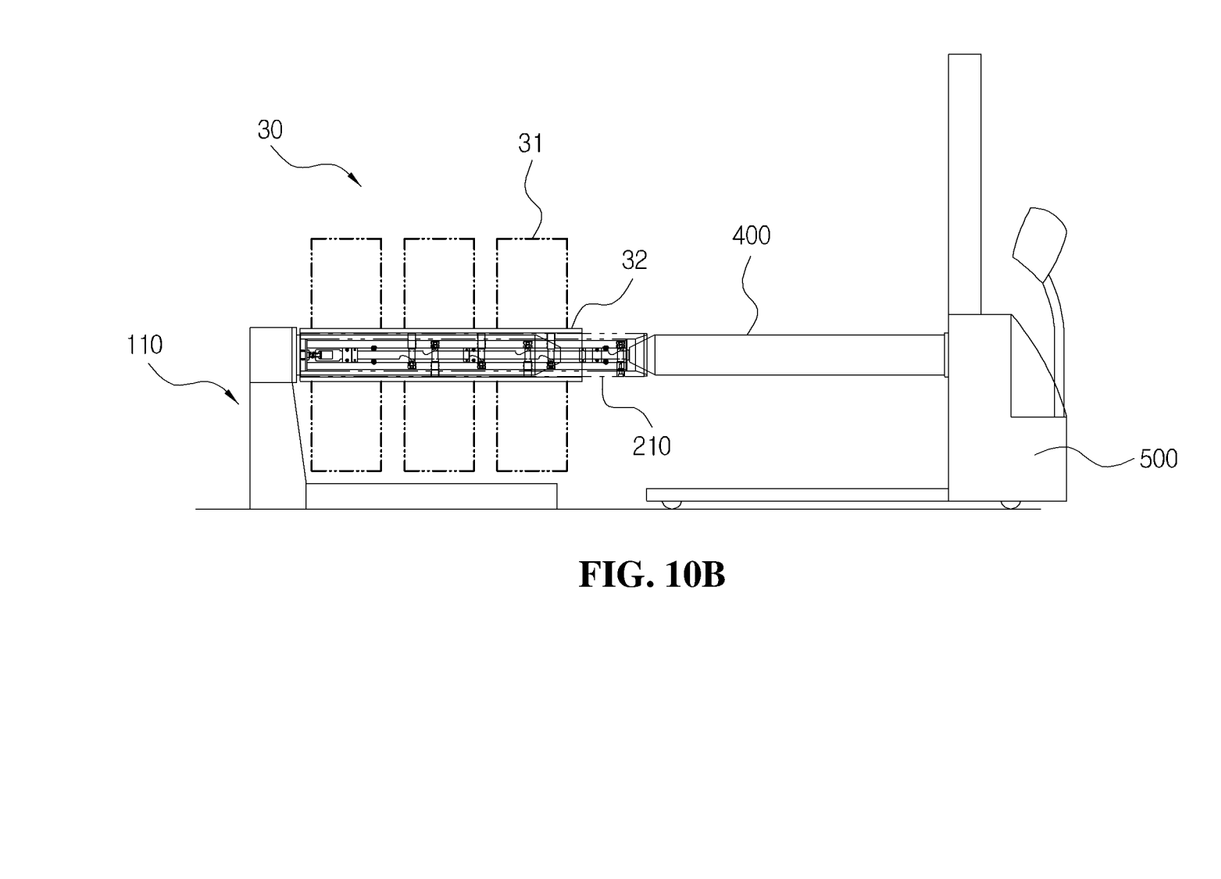

In FIG. 10B, as the jig front end 410 presses the pressing plate 327, the rod body 321 of the operating rod 320 may move backward. Accordingly, as the stopper roller 319 moves to the side surface of the rod body 321 along the guide groove 322 of the rod body 321, and one side of the stopper 318 moves in the direction of pressing the elastic member 317 interposed in the stopper insertion groove 315, the stopper 318 is in a contracted state in which the stopper front end 318a is hidden in the rail through-hole 316 and the support shaft through-hole 210a.

Figure 10C:
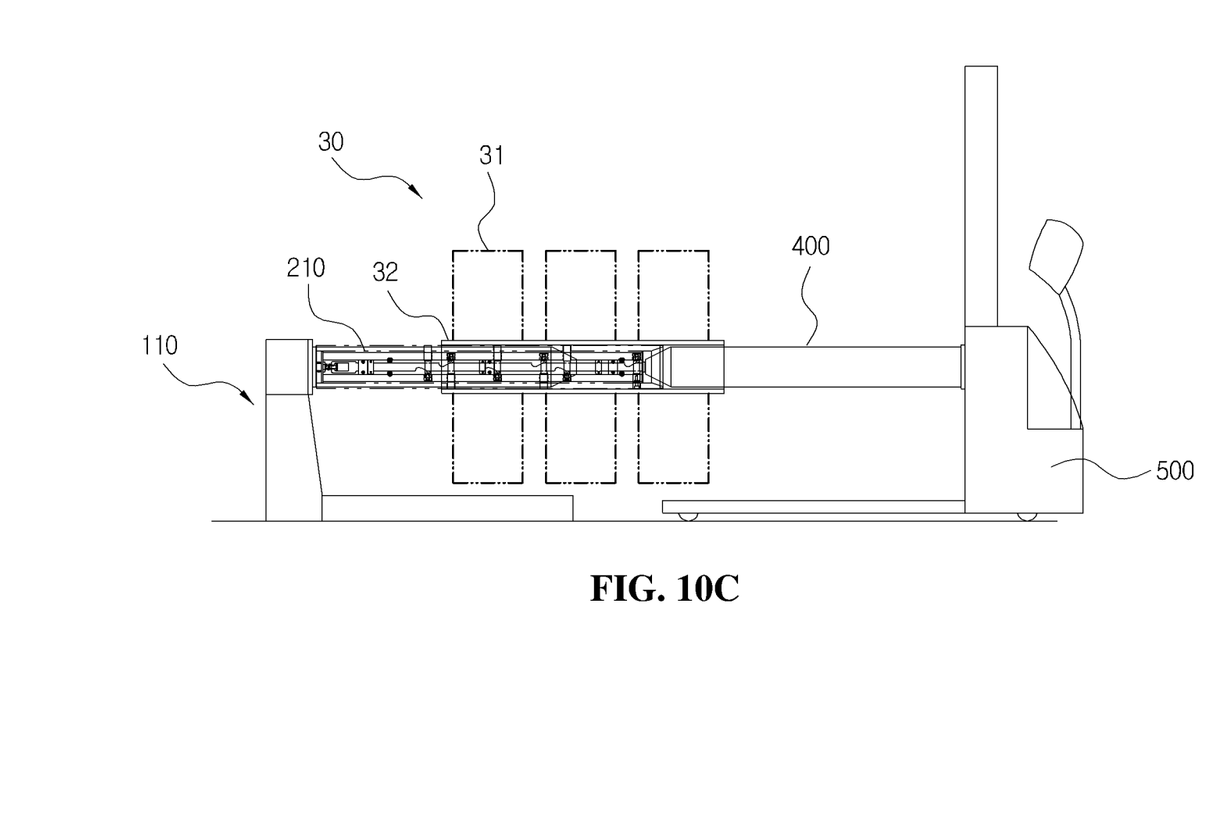

In FIG. 10C, since the core 32 of the electrode plate reel 30 is not interfered with by the stopper front end 318a in the state in which the stopper 318 is contracted, the electrode plate reel 30 can be smoothly moved toward the transport jig 400 disposed in the horizontal direction of the support shaft 210.

Figure 10D:
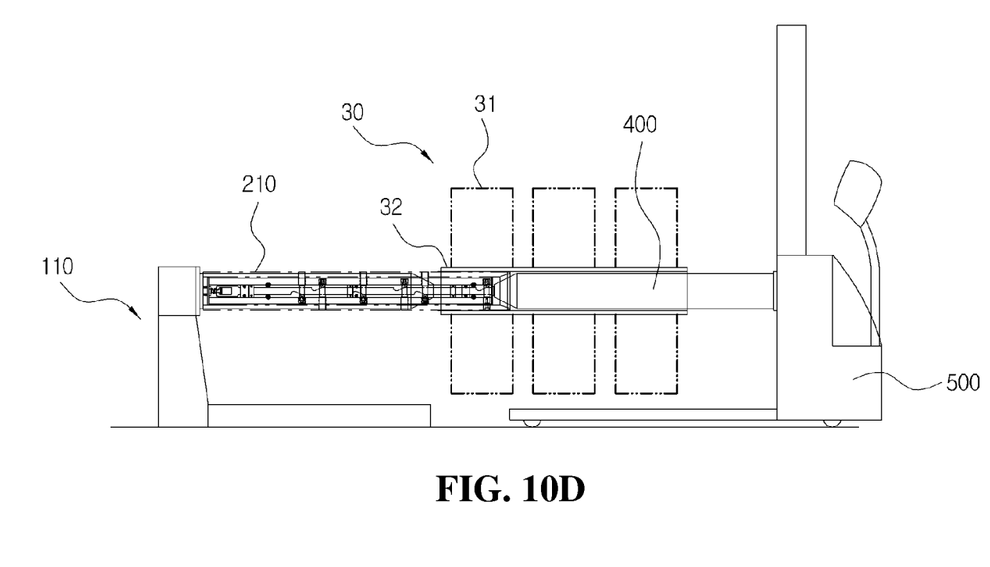
Figure 10E:
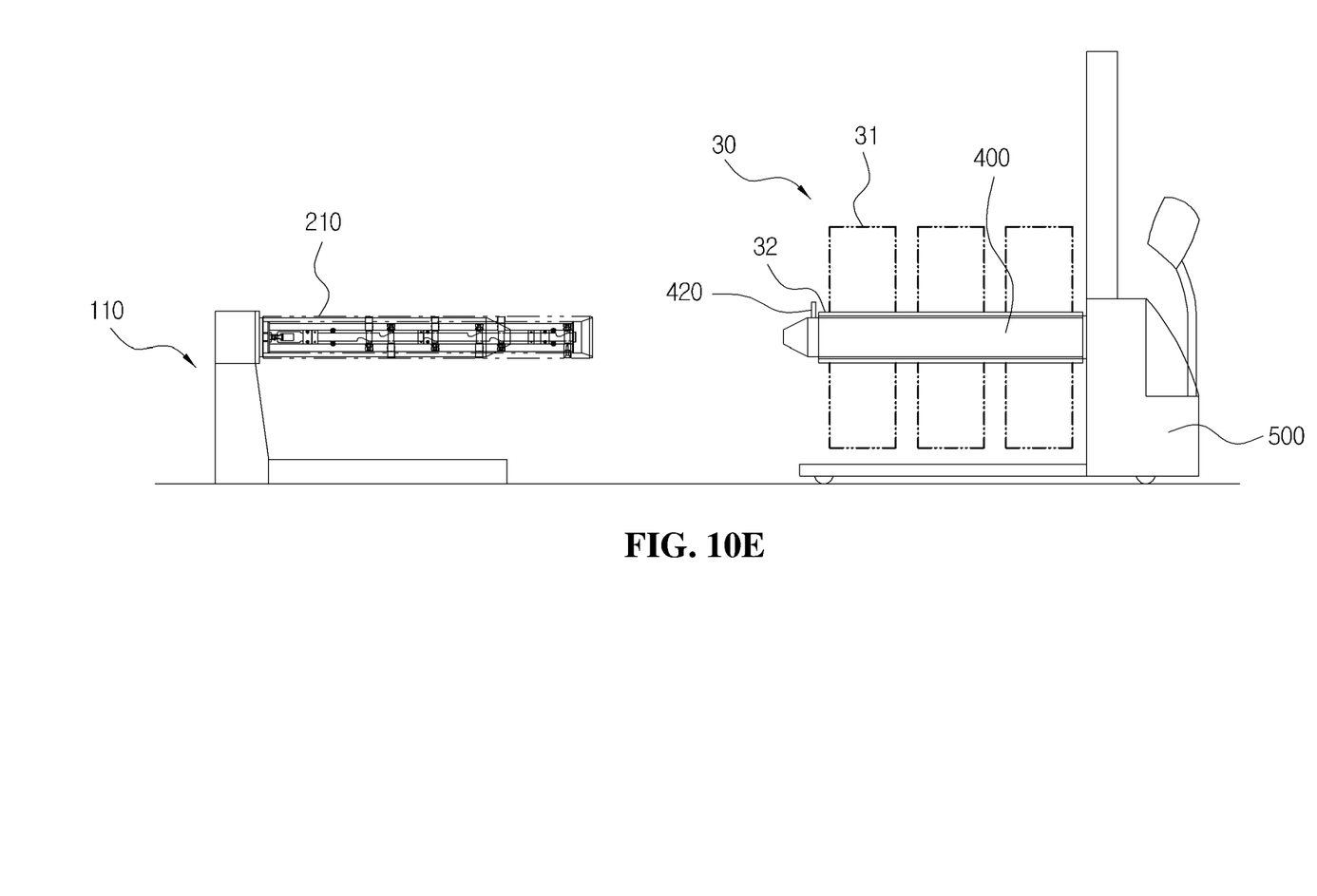

After all of the plurality of electrode plate reels 30 are moved to the transport jig 400 of the automated guided vehicle 500 as shown in FIG. 10D, a fixing pin 420 is fastened to one side of the transport jig 400 as shown in FIG. 10E, so that the outermost electrode plate reel 30 is prevented from being separated, and the transport jig 400 may then be moved to notching equipment in which a subsequent process is performed.

According to the present disclosure, an electrode plate reel is held by a stopper of a separation-preventing part during a transport operation and thus can be effectively prevented from being separated from the support shaft.

According to the present disclosure, a stopper is brought into close contact with an inner surface of a core of an electrode plate reel so that a movement of the electrode plate reel can be limited, thereby suppressing damage to the electrode plate reel.

According to the present disclosure, a process of inserting and withdrawing heavy electrode plate reels, which are slit, using an upper roller and a side roller of a support shaft, into and from a support shaft can be performed easily and conveniently.

According to the present disclosure, a stopper can be manually operated using a lever of an operation part, and also, an appearing and disappearing movement of the stopper can be controlled using a transport jig configured to apply an external force from the outside, so that the operation efficiency of the electrode plate reel can be improved when the transport jig is applied to an automated guided vehicle.

The above description of the present disclosure is only exemplary, and it will be understood by those skilled in the art that various modifications can be made without departing from the technical spirit or essential features of the present disclosure.

What is claimed is:

1. An electrode plate reel holding apparatus of an electrode plate slitting machine for a secondary battery, the electrode plate reel holding apparatus comprising:
   a hanger member which is spaced apart from a bottom surface and on which at least one wound electrode plate reel is hung using a hollow support shaft;
   a cradle configured to support the hanger member; and
   a separation-preventing part including a stopper retractably inserted into a through-hole of the hollow support shaft, and configured to hide the stopper into the through-hole of the hollow support shaft so that the electrode plate reel inserted into the hollow support shaft moves without interference and protrude the stopper out of the through-hole of the hollow support shaft so that the electrode plate reel inserted into the hollow support shaft is prevented from being separated,
   wherein the separation-preventing part includes a guide rail in which a stopper insertion groove and a rail through-hole configured to accommodate the stopper are formed at one end and the other end facing each other with a groove having an open top therebetween, an operating rod installed in a direction crossing the stopper and configured to control a position movement of the stopper, and an operation part configured to manually operate the operating rod,
   wherein the operating rod includes a rod body,
   wherein a guide groove is formed in a side surface of the rod body facing the stopper insertion groove, and
   the rod body is formed of a straight plate extending in a longitudinal direction of the guide rail.

2. The electrode plate reel holding apparatus of claim 1, wherein the cradle includes a base plate in contact with the bottom surface and configured to support an upper load, a side plate erected on the base plate, and a shaft fixture configured to fix one side of the hollow support shaft to an upper end of the side plate.

3. The electrode plate reel holding apparatus of claim 2, wherein a protective pad for impact mitigation is installed on the shaft fixture.

4. The electrode plate reel holding apparatus of claim 1, wherein the hanger member includes upper rollers and side rollers configured to guide a movement of the electrode plate reel, wherein the upper rollers and the side rollers are installed on upper and side surfaces of the hollow support shaft, respectively, in a longitudinal direction.

5. The electrode plate reel holding apparatus of claim 1, wherein the stopper has a cylindrical body in which a rod insertion-hole is formed at a center thereof, and includes a stopper roller installed in the rod insertion-hole to guide a movement of the rod body inserted into the rod insertion-hole, one side of the stopper is elastically supported by an elastic member embedded in the stopper insertion groove, a stopper front end is coupled to the other side of the stopper, and the stopper front end appears and disappears along a movement path formed by aligning the rail through-hole and the through-hole of the hollow support shaft.

6. The electrode plate reel holding apparatus of claim 1, wherein a rod front end of the rod body is formed in a ring shape to be connected to one side of the operation part, and a pressing plate is fastened to a rod tail part of the rod body using a fastening member.

7. The electrode plate reel holding apparatus of claim 6, wherein the operation part includes a holder having one side connected to the rod front end, and a lever connected to the other side of the holder that is elastically supported by an elastic member.

8. The electrode plate reel holding apparatus of claim 6, comprising a transport jig configured to move the rod body by applying an external force to the pressing plate.

9. The electrode plate reel holding apparatus of claim 8, wherein at least one wound electrode plate reel is transported using an automated guided vehicle in which the transport jig is installed.

* * * * *